April 27, 1937. H. V. REED 2,078,276
CLUTCH PLATE
Filed Oct. 8, 1934
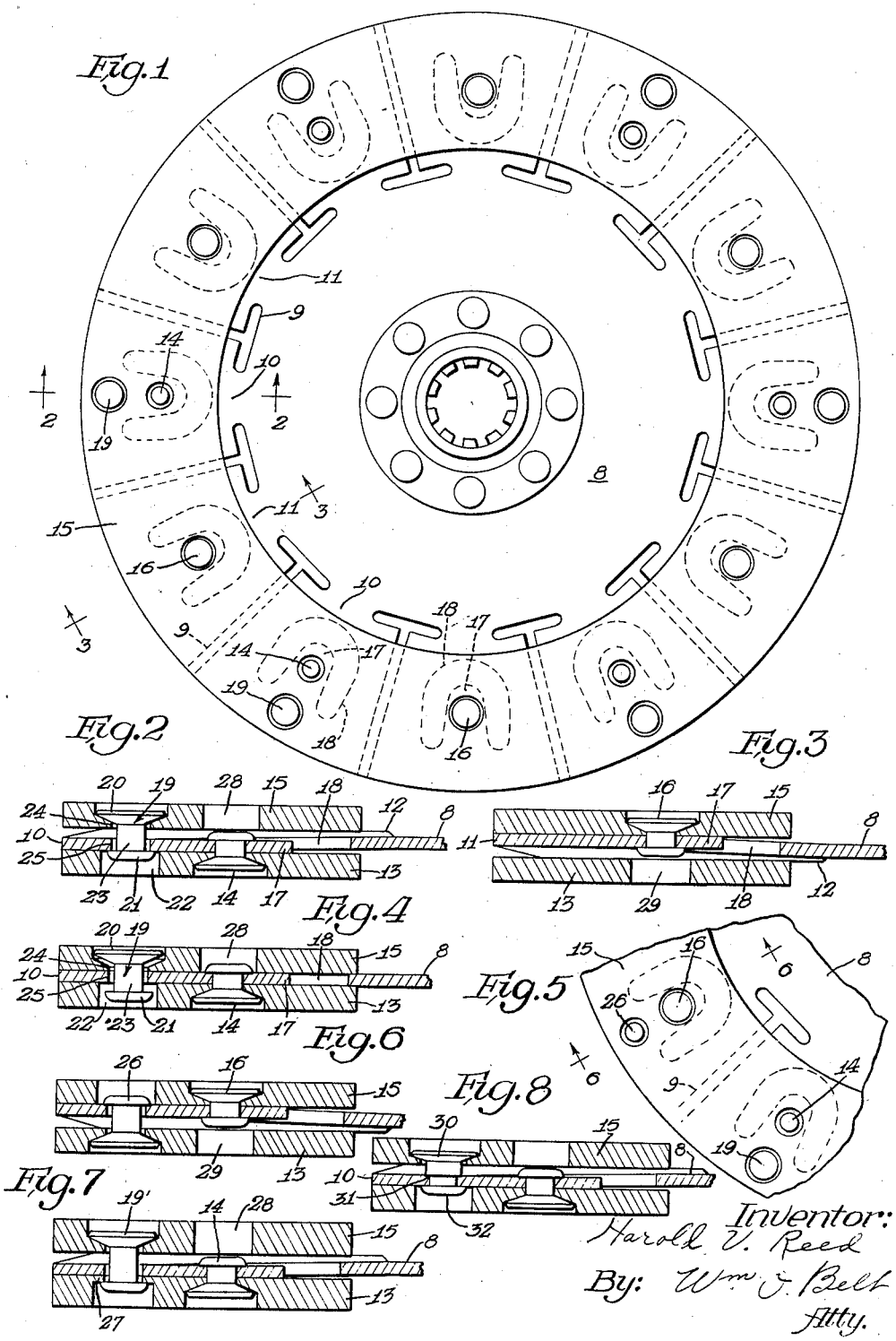
Inventor:
Harold V. Reed
By: Wm. J. Belt
Atty.

Patented Apr. 27, 1937

2,078,276

UNITED STATES PATENT OFFICE 2,078,276

CLUTCH PLATE

Harold V. Reed, Chicago, Ill., assignor, by mesne assignments, to Borg-Warner Corporation, Chicago, Ill., a corporation of Illinois Application October 8, 1934, Serial No. 747,262

8 Claims. (Cl. 192—107)

This invention relates to friction clutches for automotive vehicles and it may also be used in other friction clutches for which it is or may be adapted.

To explain the invention I will refer to one type of clutch, largely used for automotive vehicles, which includes a clutch plate adapted to be clamped between two parts of a driving member to impart motion from the driving member to a driven member. The clutch plate has comprised a metal disc with friction facings mounted on opposite sides at and adjacent the periphery of the disc. These facings have been spaced apart when the clutch is disengaged and have been capable of yielding inwardly under the clamping pressure of the parts of the driving member until the clutch is fully engaged, and this yieldability has been afforded by a cushion on the disc and interposed between the facings. The cushion has been made in different ways; for example, the peripheral portion of the disc has been slotted radially to produce a plurality of sectors, and these sectors have been bodily bent or offset laterally and alternately on opposite sides of the disc to project beyond the plane of the body of the disc. The side marginal portions of each sector have been offset from the intermediate portion, or the sectors have been curved transversely, alternately and oppositely, in forming the yielding cushions. Sections of a solid disc or of sectors have been bent laterally in the form of tongues or wings or the like to form yielding cushions, and cushions have been otherwise provided on the plate. These cushions have provided for a yielding engagement between the clutch plate and the parts of the driving member and have successfully eliminated grabbing and chatter which have often been incident to engagement of a clutch.

The clamping parts of the driving member are positioned in a definite relation to each other and with the plate therebetween so that comparatively little movement is required to effect engagement of the clutch and also so that the driven parts will clear the clutch plate when the clutch is disengaged.

The disc of the clutch plate has generally been made of metal having a relatively high coefficient of expansion while the friction facings have generally been made of woven or composition material having a relatively low coefficient of expansion. The facings are commonly riveted or otherwise fastened to the disc at spaced intervals. The friction heat developed during operation of the clutch causes the disc to expand radially to a greater extent than the facings will expand. This causes the disc to bend or buckle between the facings and this has the effect of increasing the overall thickness of the plate in the area which engages the driven member and to such an extent, at times, that the proper spacing of the clutch plate with respect to the clamping parts of the driven member will not be maintained and the facings will engage one or the other or both of these parts when the clutch is disengaged and cause the clutch to drag. It has been sought to overcome this objection by increasing the number of rivets fastening the facings to the disc but this has had the effect of producing a clutch plate of greater stiffness and with less yieldability, and objectionable chatter has resulted.

The primary object of this invention is to maintain the overall thickness of the clutch plate at the engaging area within definite maximum limits to preserve the proper spacing of the clutch plate with respect to the clamping parts of the clutch and thereby avoid the possibility of dragging in the clutch while still preserving the yieldable cushion of the clutch plate.

Another object is to preserve the capability of the facings on the disc to move relatively and laterally under the influence of the cushion therebetween when the clutch is being disengaged and to definitely confine the maximum spreading or separation of the facings within predetermined limits.

Another object is to prevent that part of the clutch disc within the clamping area from being distorted as the result of friction heat developed in the operation of the clutch or other causes to an extent which would spread or separate the facings more than a predetermined maximum.

And a further object is to provide floating means in the clutch plate to control the spreading or separating of the facings and to maintain the overall thickness of the clutch plate at the engaging area within definite maximum limits to avoid contact with the clamping parts of the clutch during disengagement.

In the accompanying drawing illustrating the invention:

Fig. 1 is a plan view of one type of clutch plate embodying the invention;

Figs. 2 and 3 are enlarged detail sectional views on the lines 2—2 and 3—3 respectively of Fig. 1;

Fig. 4 is a view similar to Fig. 2 and showing the parts of the clutch plate in position when the clutch is engaged;

Fig. 5 is a fragmentary plan view of the clutch plate showing another embodiment of the invention;

Fig. 6 is a sectional view on the line 6—6 of Fig. 5;

Fig. 7 is a sectional view similar to Fig. 2 and showing a modified form of the invention; and Fig. 8 is a sectional view similar to Fig. 2 showing another form of the invention with a non-floating rivet.

Referring to the drawing, the type of clutch plate therein shown comprises a disc 8 having its peripheral portion divided into sectors by T-shaped slots 9 extending radially from the periphery of the disc. Alternate sectors 10 are bent bodily to one side of the plane of the body of the disc and the other sectors 11 are similarly bent to the other side of the plane of the body of the disc, and the sectors may also be bent transversely or have their side edges bent laterally, as indicated at 12, according to known practice. A friction facing 13 is fastened by rivets 14 to the sectors 10, and a friction facing 15 is fastened by rivets 16 to the sectors 11. The facings shown are in the form of continuous rings and the rivets 14, 16 engage projecting tongues 17 formed in the disc by cut-outs 18 and tightly fasten the facings to the disc. Thus the facings 13 and 15 are spaced apart on the disc by yielding cushions formed by integral parts of the disc, the outer faces of the facings being maintained in parallelism.

When the clutch plate is made the thickness of the plate at the facings, which is the engaging area, is predetermined with respect to the clamping parts of the driving member and, if the plate were not liable to distortion under the influence of friction heat, the plate would continue to function properly until the facings are worn out. But experience has shown that the friction heat causes distortion of the plate because the metal disc expands to a greater degree than the facings, and since the facings are riveted solidly to the disc the latter is caused to buckle or otherwise distort and this results in a distorted plate which may drag upon one or both parts of the driving member when the clutch is disengaged and produce chatter and excessive wear.

To overcome these objections I provide means for limiting the spreading or separating of the facings under any distortion of the disc. These means comprise rivets 19 each having one head 20 engaging one facing 15, another head 21 seated in an opening 22 in the other facing 13 and against the disc, and a shank 23 extending freely through an enlarged opening 24 in the facing 15 and an enlarged opening 25 in the disc. It is preferred that these limiting rivets 19 shall fit reasonably snug in the plate when the clutch is disengaged, as shown in Fig. 3, at which time the facings are spread apart to the limit by the interposed yielding cushion of the disc. When the clutch is engaged and the clamping area of the plate is fully compressed, as shown in Fig. 4, the rivets 19 will float in the clutch plate without wearing contact with the parts of the driving member and this condition will continue until the facings are worn out to an extent which makes replacement desirable.

The rivets 19 limit the expansion or increase of thickness of the plate at the clamping area and do not interfere with the cushion effect or with the clamping of the plate in engaging the clutch. Tendency of the disc to distort under heat to an extent sufficient to increase the thickness of the plate at the clamping area, in whole or in part, is resisted by the rivets 19 which restrain spreading or separation of the facings beyond the predetermined limits determined by these rivets.

Under many conditions it is believed that one set of rivets 19 in alternate sectors or spaced apart substantially as shown in Fig. 1 will be sufficient to prevent distortion of the plate sufficient to cause dragging in the clutch and excessive wear. These rivets 19 directly engage one facing 15 and control the other facing 13 through direct engagement with the disc to which the facing 13 is secured by the rivets 14. Additional rivets 26 similar to the rivets 19 may be provided as shown in Figs. 5 and 6 and interposed between the rivets 19 and arranged in reverse position. Or if it is desired to have the limiting rivets directly engage both facings, the facing 13 may be provided with a shoulder 27 in which case the rivet 19' would be made longer to engage the shoulder. The facing 15 is provided with openings 28 to receive the head of rivets 14 and the facing 13 is provided with openings 29 to receive the head of rivets 16 when the plate is under compression during engagement of the clutch. Instead of arranging the limiting rivets 19, 26 to float in the disc and facings I may secure these rivets tightly in the disc so that there will be a floating action of each rivet in one facing only, or at least a relative movement of the rivet and one facing; and referring to Fig. 8 I have shown a limiting rivet 30 tightly secured in the sector 10 of the disc 8 between a shoulder 31 and the head 32 on the rivet.

The invention provides a simple means for overcoming the effects of distortion of the plate from friction heat by maintaining the maximum thickness of the plate at the clamping area within definite predetermined limits and preventing the spreading or separating of the facings in whole or in part from distortion of the disc beyond these limits. Thus the plate will retain the beneficial effect of the cushion to provide a smooth engagement of the clutch and avoid chatter and also avoid dragging in the clutch during disengagement.

While I have shown and described the invention in a particular type of clutch plate I do not mean thereby to restrict the invention to this embodiment for it can be employed in many different kinds of clutches and clutch plates with satisfactory results; and therefore I reserve the right to use the invention in any form and for any purpose for which it is or may be adapted within the scope of the following claims.

I claim:

1. A clutch plate comprising, a disc adapted to be mounted upon a driven shaft, a pair of annular friction facings disposed one on each side of said disc, yielding means on the disc and engaging said facings yieldably to urge said facings, by bodily movement, away from the plane of said disc along the longitudinal axis thereof, and other means in direct engagement with said disc and said facings for limiting the bodily movement of said facings away from the plane of said disc.

2. A clutch plate comprising a disc and friction facings attached to opposite sides thereof, yielding means integral with the disc and located beneath the facings for spreading and cushioning the facings, and means to limit the extent of spreading of the facings.

3. A clutch plate comprising a disc and friction facings attached to opposite sides thereof, means for spreading the facings, and means floating in the disc and facings to limit the extent of spreading of the facings.

4. A clutch plate comprising a disc and friction facings attached to opposite sides thereof, means for spreading the facings, and means floating in the disc and facings to limit the extent of spreading of the facings, said floating means being of less length than the thickness of the disc and facings when the plate is under compression.

5. A clutch plate comprising a disc and friction facings attached to opposite sides thereof, means for spreading the facings, and separate means for each facing floating in the disc and the facing to limit the extent of spreading of the facings.

6. A clutch plate comprising a disc and friction facings attached to opposite sides thereof, means for spreading the facings, and means floating in the disc and facings and engaging both of the facings to limit the extent of spreading of the facings.

7. A clutch plate comprising a disc, sectors formed in the disc at the periphery thereof, friction facings fastened to said sectors, said sectors being bent to provide cushions supporting said facings for movement relative to the plane of the disc, and means for limiting the movement of the facings relative to the plane of the disc.

8. A clutch plate comprising a disc, sectors formed in said disc and alternately and oppositely bent bodily to form cushions, a friction facing on one side of said plate and fastened to some of said sectors to be movable relative to the plane of the disc, a friction facing on the other side of said plate and fastened to the other sectors to be movable relative to the plane of the disc, and means for limiting the movement of said facings relative to the plane of the disc.

HAROLD V. REED.